US008269982B1

(12) United States Patent
Olczak et al.

(10) Patent No.: US 8,269,982 B1
(45) Date of Patent: Sep. 18, 2012

(54) SURFACE DEFORMATION MEASURING SYSTEM WITH A RETRO-REFLECTIVE SURFACE TREATMENT

(75) Inventors: Gene Olczak, Pittsford, NY (US); Stephen D O'Donohue, Rochester, NY (US); Thomas W Dey, Springwater, NY (US); Cormic K Merle, Rochester, NY (US)

(73) Assignee: Exelis, Inc., McClean, VA (US)

( * ) Notice: Subject to any disclaimer, the term of this patent is extended or adjusted under 35 U.S.C. 154(b) by 226 days.

(21) Appl. No.: 12/721,009

(22) Filed: Mar. 10, 2010

(51) Int. Cl.
*G01B 11/02* (2006.01)
(52) U.S. Cl. .......................................... 356/513
(58) Field of Classification Search .............. 356/35.5, 356/487, 495, 511–514
See application file for complete search history.

(56) References Cited

U.S. PATENT DOCUMENTS

| 4,443,103 | A  | * | 4/1984  | Erdmann et al. | 356/139.03 |
| 6,258,443 | B1 | * | 7/2001  | Nilsen et al.  | 428/156    |
| 2001/0048169 | A1 | * | 12/2001 | Nilsen et al.  | 264/2.5    |
| 2009/0310118 | A1 | * | 12/2009 | Halldorsson    | 356/28     |

OTHER PUBLICATIONS

Owner-Peterson, Digital speckle pattern shearing interferometry: limitations and prospects, Applied Optics, vol. 30, No. 19, Jul. 1991.*
Moore et al, Transient deformation measurement with electronic speckle pattern interferometry and a high-speed camera, Applied Optics, vol. 38, No. 7, Mar. 1999.*
Optical Shop Testing, Third Edition, Section 16.2, Edited by Malacara, Daniel, 2007.
Morris, Michael North; Millerd, James; Hayes, John and Saif, Babak, Dynamic Phase-Shifting Electronic Speckle Pattern Interferometer, Space Telescope Science Institute, Baltimore, MD, SPIE, Aug. 2005.
4D Technology, Phasecam ESPI Brochure, 2003.
3M Product Bulletin, Prismatic Remote Sensing Target, May 2009.

* cited by examiner

*Primary Examiner* — Gregory J Toatley
*Assistant Examiner* — Dominic J Bologna
(74) *Attorney, Agent, or Firm* — RatnerPrestia (57) ABSTRACT

A system for measuring deformation of at least one surface of an object including an interferometer for receiving illumination reflected from the surface of the object, and a surface treatment disposed on the surface of the object for providing a retro-reflective patina. The retro-reflective patina is configured to reflect the illumination from the surface of the object. The retro-reflective patina is attached to the surface of the object and may include a plurality of cube corners, or a plurality of dielectric spheres, or a combination of cube corners and dielectric spheres. Impinging light onto the object is provided by an optical source that may be separate from or integral to the interferometer. The impinging light may be directed toward the object through an objective lens, which is also used for receiving the illumination from the object. Alternatively, the impinging light may be directed toward the object by first bypassing the objective lens.

20 Claims, 7 Drawing Sheets

CORNER-CUBE-ARRAY SHEET 106'

FIG. 1D

CORNER CUBE PRISM 106'

SURFACE DEFORMATION MEASURING SYSTEM WITH A RETRO-REFLECTIVE SURFACE TREATMENT

FIELD OF INVENTION

The present invention is related, in general, to a system and method for measuring surface deformations, or changes in topology of an arbitrarily shaped object. More specifically, the present invention relates to a system and method for measuring the surface deformations by including a retro-reflective surface treatment on the surface of the object under measurement.

BACKGROUND OF THE INVENTION

Technologies for measuring surface deformations, or changes in topology in arbitrarily shaped objects include holography, electronic shearography and electronic speckle detection.

These technologies are different from traditional interferometry. In a traditional interferometer, the measurement system is designed to emit a uniphase (typically spatially coherent) beam of light and receive a specular return of the light from an object. The object must have at least one optically smooth surface. The shape of the surface is such that it matches (or nearly matches) the shape of the wavefront of the impinging beam of light over at least a portion of one of the object surfaces.

In contrast, a holographic or speckle test (HOST) is performed with diffusely reflected light, such that the surfaces of the object have no predetermined shape restriction with respect to the impinging beam (or beams) of light.

Optical Shop Testing, Third Edition, Section 16.2, edited by Daniel Malacara, describes holographic and speckle testing of an object that is subjected to stress. As described, when a laser beam is scattered from a diffuse surface, the scattered light has a grainy appearance. The grainy appearance is an interference phenomenon know as speckle. The statistics of a speckle distribution depend upon the statistics of the object surface. If imaged by a lens, the speckle is said to be subjective, and the smallest speckle in the image has a size equal to the Airy disk, $2.44\lambda/F/\#$ generated by the optical system, where $F/\#$ is the working F-number of the system and $\lambda$ is the wavelength of light. The intensity distribution and the statistics of the speckle pattern are an indication of the roughness of the surface used to generate the speckle pattern. A speckle pattern generated by an object surface may be thought of as the object's fingerprint.

When the object is perturbed in some way, the speckle pattern changes in a predictable way. Two different techniques, which may be used to determine the perturbation of the object, are speckle photography and speckle interferometry. Both techniques involve a comparison of two or more speckle patterns. Both techniques are briefly described below.

Speckle interferometry includes a reference beam to enable measurement of the phase change in the speckles. It is assumed that the speckles from one speckle pattern to another are correlated, so that they do not shift by more than the diameter of a speckle between exposures. Speckle photography looks at the correlation between two speckle patterns where the fringes arise from a translation between exposures. The speckles from a small area of the two speckle patterns (translated with respect to one another) generate fringes in the Fourier plane.

When TV cameras began being used and digital images stored and processed in hardware via electronics, these techniques were first named electronic speckle pattern interferometry (ESPI) and often called TV holography. Because of the low spatial frequency response of TV cameras these techniques measured in-line holograms. As cameras with higher spatial resolutions became available, it became possible to make off-axis holograms. These techniques are known as digital holography or phase shifting ESPI. Digital holography refers to any type of hologram stored and reconstructed digitally, and the term speckle interferometry also refers to the same systems where speckles are present. The mechanisms for creating interference are similar in both, and results are as well. What differentiates one technique from another is how well different spatial frequency structures are reconstructed, and how immune to noise the techniques are.

ESPI uses an optical setup including a TV camera, CCD camera, or detector array placed at the image of the test surface. Because standard video signals are generated, the results of a test may be stored electronically for later viewing and processing. A speckle interferogram of the object is recorded by the camera and stored electronically. A single interferogram may be written as $$I = I_0(1 + \partial \cos \phi)$$

Where $I_0$ is the dc density, $\partial$ is the visibility, and $\phi$ is the phase of the interference between the reference beam and the speckle pattern scattered by the object. After the stress applied to the object is changed, the above becomes $$I = I_0(1 + \partial \cos \phi')$$

where $\phi' = \phi + \Delta\phi$, and $\Delta\phi$ is the phase change. The stored interferogram is then subtracted from exposures recorded after a change in applied stress to the object, and the difference is squared to yield $$I^2 = I_0^2 \partial^2 (\sin^2 \phi)[\sin^2(\Delta\phi/2)]$$

This equation shows that there are fringes due to object displacement $\Delta\phi$ as well as fringes due to the phase of speckles $\phi$ resulting from the interference between the reference and speckled object beams.

Because processing for static and dynamic measurements is performed in electronics, fringe data may be obtained with ESPI at video frame rates (25 or 30 frames per second) or faster, depending upon the camera and data acquisition hardware. This speed enables measurements to be made even when the object is not very stable.

Because of the diffuse nature of the reflected light from the object under test, the illumination efficiency of a HOST system is very low. The efficiency is very low due to the fact that the diffusely reflected light scatters substantially from the object (or work piece), typically filling a large solid angle, but the receiving optics (the optics that form the image of the object under test) operates with a much smaller solid angle. The angular efficiency loss due to the solid angle mismatch may be greater than 1000 times (solid angle of diffuse reflection power divided by solid angle of receiving optics).

In addition, because of the angular efficiency loss, conventional HOST systems require very high power illumination lasers (greater that 100 milliwatts of optical output), or the HOST systems are restricted to work over short distances (roughly, over a distance of a meter, or less).

As will be explained, the present invention provides a system and method for measuring surface deformations by including retro-reflective surface treatments on the surface of an object under test. The present invention improves on conventional systems and methods by not requiring a HOST system with a high power illumination laser, nor requiring a HOST system which is restricted to operate over short distances.

SUMMARY OF THE INVENTION

To meet this and other needs, and in view of its purposes, the present invention provides a system for testing a surface of an object. The system includes an interferometer for receiving illumination reflected from the surface of the object, and a surface treatment disposed on the surface of the object for providing a retro-reflective patina. An objective lens is disposed between the interferometer and the surface treatment for producing a speckle image of at least a portion of the surface of the object. The retro-reflective patina is configured to substantially retro-reflect the illumination from the surface of the object.

The retro-reflective patina may include a plurality of cube corners. The retro-reflective patina may include a plurality of dielectric spheres. The retro-reflective patina may include a combination of cube corners and dielectric spheres.

The system includes an illumination source for impinging illumination onto the surface of the object. The retro-reflective patina may reflect light from the surface of the object within 4 degrees of a line parallel to the impinging illumination. The retro-reflective patina may reflect light from the surface of the object within 20 degrees of a line parallel to the impinging illumination.

The retro-reflective patina may be attached to the surface of the object by an adhesive layer. The retro-reflective patina may be attached to the surface of the object by an electroplating technique.

The illumination source and the objective lens may be aligned co-axially or may not be aligned co-axially. An absolute distance measuring device may be included in the system for monitoring a location of the object relative to the interferometer.

Another embodiment of the present invention includes a method for measuring a topology of an object using speckle interferometry. The method includes the steps of disposing retro-reflective elements (RREs) on at least one surface of the object; impinging light onto the at least one surface of the object; and measuring, using a speckle interferometer, returned light from the at least one surface of the object to determine the topology of the object. The step of disposing RREs may include fastening dielectric beads to the at least one surface of the object. The step of disposing RREs may also include adhering a retro-reflective tape to the at least one surface of the object.

The step of disposing RREs may further include fastening optical cube corners to the at least one surface of the object. The step of disposing RREs may still further include spatially distributing the RREs in a random manner, or spatially distributing the RREs in a structured manner.

The step of measuring the returned light may include using a camera to record images of the returned light from the RREs disposed on the at least one surface of the object.

The method may includes the step of monitoring the location of the object relative to the interferometer by using an absolute distance measuring device.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

As will be explained, the present invention includes an improved holographic or speckle test (HOST) system that overcomes limitations of the conventional HOST systems by employing a retro-reflective surface treatment on one or more surfaces of the object under test and locating one or more sources coaxially with, or nearly coaxial to the optical axis of the receiving optics or the HOST system.

The retro-reflective surface treatment of the present invention includes several individual retro-reflective elements (RREs). These elements may include any combination of optical transparent dielectric spheres, cube corners, or other shaped reflective elements, where the size of the largest linear dimension of each element is typically less than 2 millimeters and more than 10 micrometers. The distribution of these elements may be tightly controlled or may be randomly distributed along at least one surface of the object under test.

The behavior of the surface of the object, which is treated with these retro-reflective elements, as observed through a focusing lens, is similar to a diffuse surface, but advantageously provides a reflected optical signal that is up to 3000 times larger than an optical signal reflected from a conventional diffusive surface.

An exemplary treated surface may include a Prismatic Remote Sensing Target 3000X which is manufactured by 3M. The Prismatic Remote Sensing Target 3000X is a micro-cube corner sheeting made of a flexible synthetic resin which performs well with polarized light. The smooth, clear sheeting may be cleaned easily and provides an excellent bond to most clean, wax-free, dry, relatively non-porous, weather resistant surfaces. The adhesive on the sheeting is protected by a liner which is removed at the time of application to a surface. The sheeting may be hand or die cut, one sheet at a time. It will be appreciated that these 3M sheets have previously been applied in traffic locations requiring reflective light for improved safety to drivers on a road. The present invention suggests using the same 3M sheets, as one example, to effectively add HOST capability to conventional interferometer measurements.

Figure 1A:
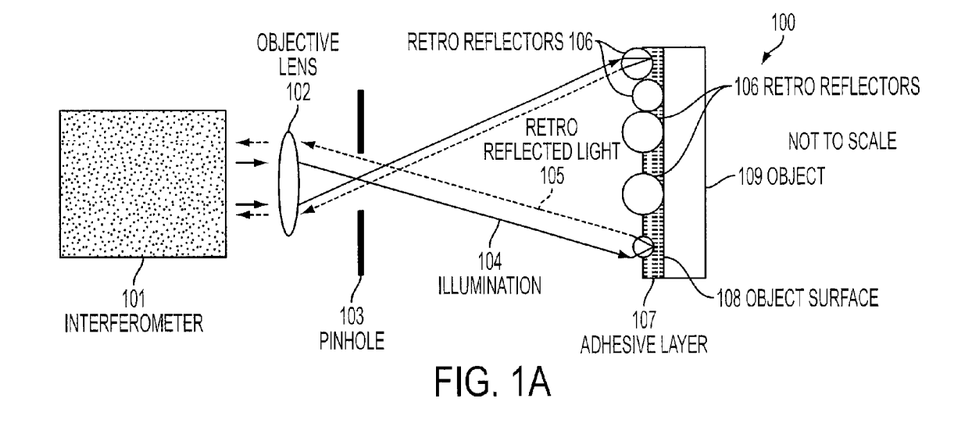
FIG. 1A is a functional block diagram of a holographic or speckle test (HOST) system, including spherical retro-reflectors attached to a surface of an object under test, in accordance with an embodiment of the present invention.

An embodiment of the present invention is shown in FIG. 1A. As shown, a HOST system, generally designated as 100, includes an interferometer 101 illuminating an object under test 109. Transmitted light 104 is passed through an optional pinhole 103 toward object 109 and reflected off multiple retro-reflectors 106, which are adhered to surface 109 by an adhesive layer 107. The reflected light is designated as 105.

The interferometer 101 may include a sensing system with an integral optical source, a reference wavefront arm, and two dimensional image detectors (not shown). The illumination 104, which is shown as integral and co-axial to the interferometer, is de-collimated and projected out to object 109 through an objective lens 102. It will be understood that the objective lens may be any imaging device employing refractive, reflective, or another imaging technique.

The impinging light is retro-reflected by retro reflective elements 106 that may be fixed to the object by an adhesive layer 107. The adhesive layer may be loaded with a reflective pigment, such as titanium dioxide particles (or may also be a commercially available paint).

The retro-reflective layer may include any combination of optical transparent dielectric spheres, cube corners, or other reflective elements, where the size of the largest linear dimension of each element is typically less than 2 millimeters and more than 10 micrometers. The size distribution of the retro-reflective elements may be tightly controlled or may be randomly varied. The spatial distribution of the elements is similar to its linear dimension; it may be somewhat smaller or larger, and may be structured (not random) or random.

The retro reflected light 105 is received by the objective lens and interferometer through an optional pinhole 103. The pinhole is sized so that is does not substantially affect the illumination beam, but does control the size of the speckle on the object under test, as viewed by the interferometer. Alternatively, the speckle size may be controlled by an optical stop which is internal to the interferometer (not shown).

Figure 1B:
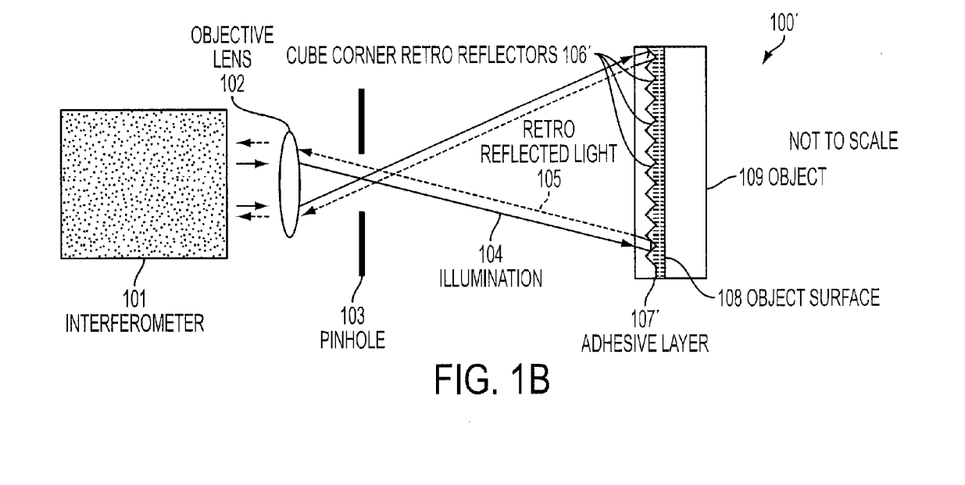
FIG. 1B is a functional block diagram of a HOST system, including cube corner retro-reflectors attached to a surface of an object under test, in accordance with another embodiment of the present invention.
Figure 1C:
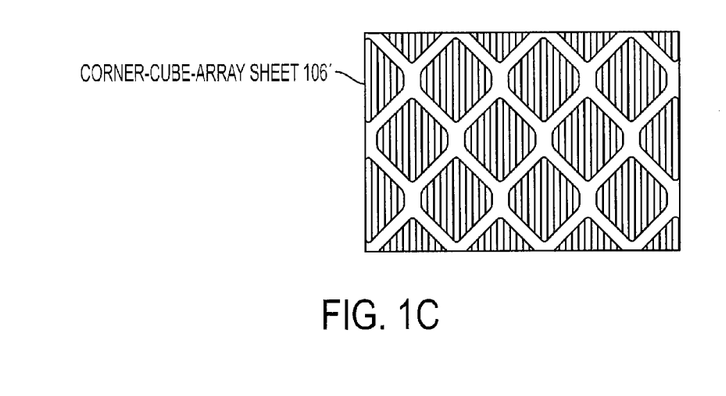
FIG. 1C is a planar view of an exemplary adhesive sheet including an array of cube corner retro-reflectors as shown in FIG. 1B.
Figure 1D:
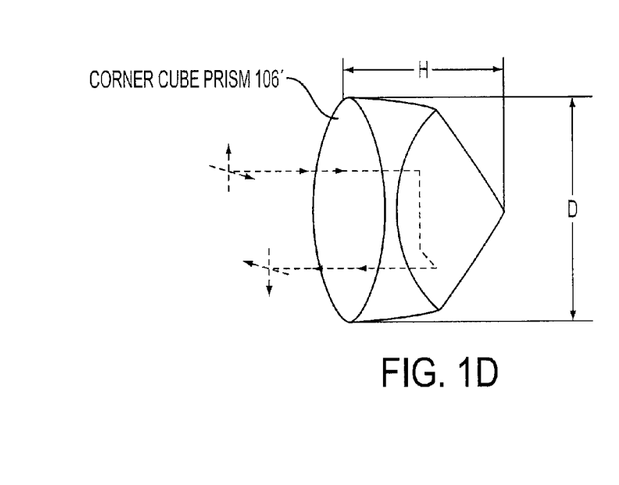
FIG. 1D is a side view of an exemplary single corner cube prism included in the array shown in FIG. 1B.

Another embodiment of the present invention is shown in FIG. 1B. As shown, the HOST system of the invention, generally designated by 100', is similar to the HOST system of the invention shown in FIG. 1A. An exception, however, is that the retro-reflectors include cube corner retro-reflectors, generally designated by 106', which are deposited onto a surface of object 109, by way of an adhesive layer 107'. An array of cube corner retro-reflectors is shown in a planar view in FIG. 1C. A side view of a single cube corner retro-reflector is shown in FIG. 1B. It will be appreciated that each cube corner retro-reflector behaves like a corner cube prism. Furthermore, as shown, the apex of each triangle of the cube prism is deposited closer to the surface of the object under test.

It will also be appreciated that the retro-reflective material shown in FIGS. 1A and 1B are deposited into the adhesive substrate 107 (107'). Alternatively, the retro-reflective material may be deposited directly onto the surface under test by static electrical charge without any use of an adhesive layer. This may provide an advantage of easy clean up of the tested surface after completion of the test.

Figure 2:
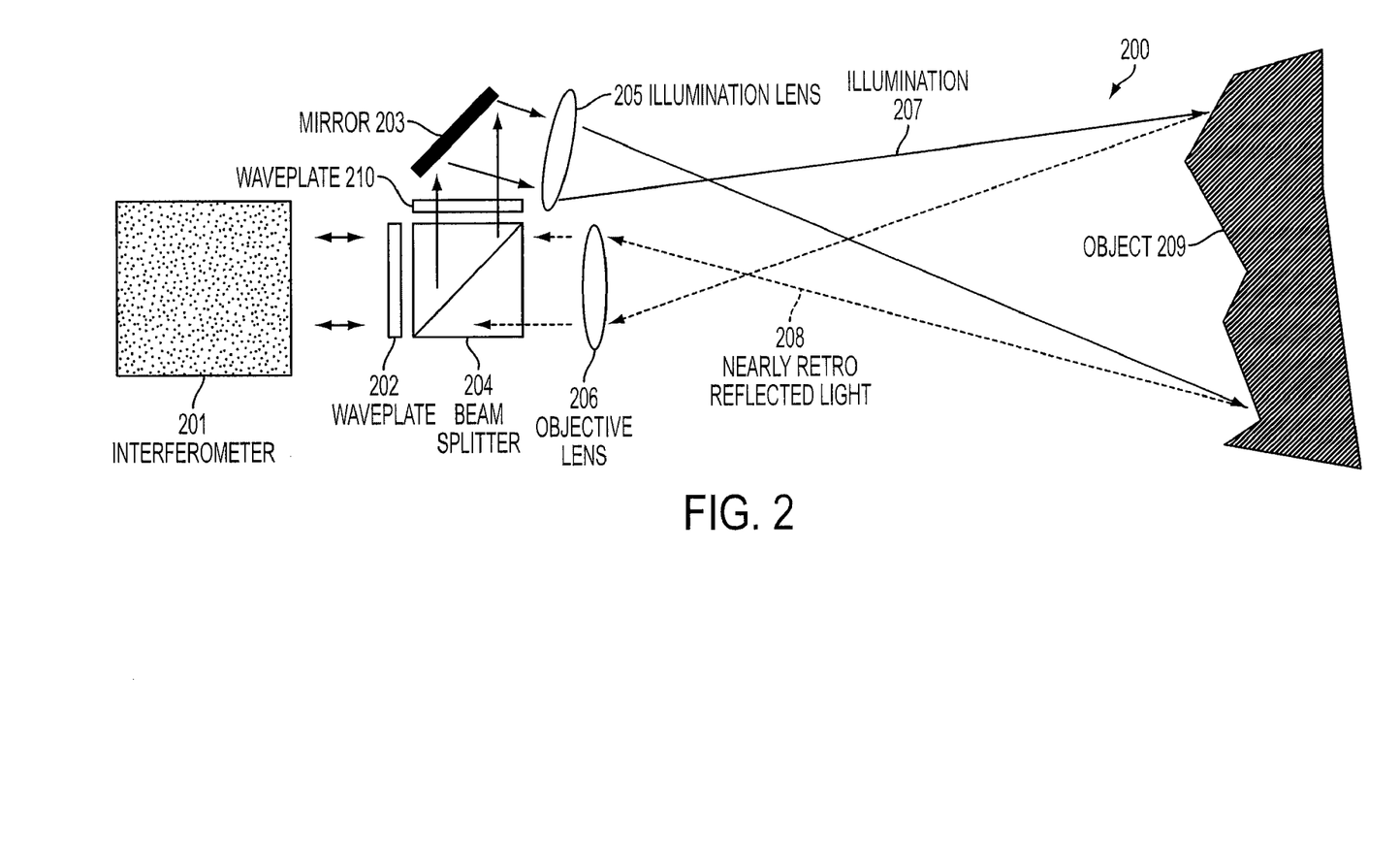
FIG. 2 is a functional block diagram of a HOST system, including an integral illumination source originating in an interferometer, where the impinging light provided to the object bypasses a receiving objective lens, in accordance with an embodiment of the present invention.

Referring next to FIG. 2, there is shown yet another embodiment of the present invention. As shown, HOST system 200 includes interferometer 201 illuminating object 209. The illumination 207 is directed around objective lens 206 by a beam splitter 204, and is projected onto object 209 by mirror 203 and illumination lens 205. As in FIG. 1A or 1B, a retro-reflective surface treatment has been applied to multiple surfaces of object 209.

If the output of interferometer 201 is circularly polarized, then a quarter waveplate 202 (which is optional) may be inserted between the beam splitter and the interferometer, so that the illumination becomes linearly polarized at the beam splitter. If the beam splitter is a polarizing beam splitter type, then the illumination may be efficiently redirected around objective lens 206. This redirection has two advantages over the embodiments shown in FIGS. 1A and 1B. Any undesirable back reflections from the objective lens may be minimized and the illumination may be linearly polarized at the object (this simplifies the polarization behavior at the object). Another optional waveplate 210 may be included in the system as a half waveplate, so the polarization of the nearly retro-reflected light 208 may be rotated to efficiently transmit light back to the interferometer.

The HOST system 200 takes advantage of the fact that the retro-reflective surface treatments are not perfect. High performance surface treatments may reflect much of the light parallel to the impinging illumination to within a 4 degree half angle cone. Lower performance retro-reflectors, however, may return light within a 20 degree half angle cone and, thus, may be received by an objective lens that is not perfectly aligned with the impinging illumination.

The higher performance surface treatments (also referred to as patinas) are typically formed from high precision cube corner reflectors (FIG. 1B). The lower performance surface treatment materials are typically formed from low index glass beads (reflective index of 1.51). High index glass beads are typically between the higher performance surface treatments and the lower performance surface treatments (reflective index of 1.9-2.1).

Even the lowest performance (but well designed) patinas may return substantially more signal to the interferometer than a diffuse surface. The angular deviation of the illumination and the objective lens from all locations included in the measurement on the surface patina should preferably be less than the half angle cone for the patina employed in the test. As a definition in this disclosure, the term "substantially retro-reflective" includes a characteristic or mode that is either perfectly retro-reflective, or nearly retro-reflective.

The retro-reflective patina may be formed directly in the adhesive layer or directly in the bulk material of the object under test. For example, cube corner elements may be formed on a surface using a negative master imprinted into a UV cured acrylate material, or embossed into a thermoplastic material. Other formable materials include (but are not limited to) silicons, cellulose layers, metals, glasses and gelatins. If the corner cubes are internally reflecting, the exemplary material may be a transparent dielectric. First surface retro-reflective elements may be machined directly into the object surface (or multiple surfaces), by wet or dry etching, diamond turning, electronic discharge machining, stamping, or other techniques. In general, cube corners may be first surface reflecting or internally reflecting. Furthermore, polarization preserving/altering thin film coatings may be applied to the faces of the cube corners.

Additional surface treatments may further enhance the operation of the patina. These may include polarization filters or rotators, including films of stretched polymers or liquid crystals.

Surface or volumetric diffusing components that introduce matt/haze in the patina may be used to tune the retro-reflective characteristics or increase randomness in the optical path differences between the object under test and the reference arms of the interferometer. Reflective thin films may be used to boost the return signal from the object under test.

The patina may be applied to the object under test in small discrete surface tiles such that the stress build up across the object may be reduced and the surface contours may be easier to follow. The tiles may be immediately adjacent to neighboring tiles. Less aggressive adhesives or other materials may be used if the patina is to be removed after the test. The patina tiles may be sections of a tape.

Figure 3:
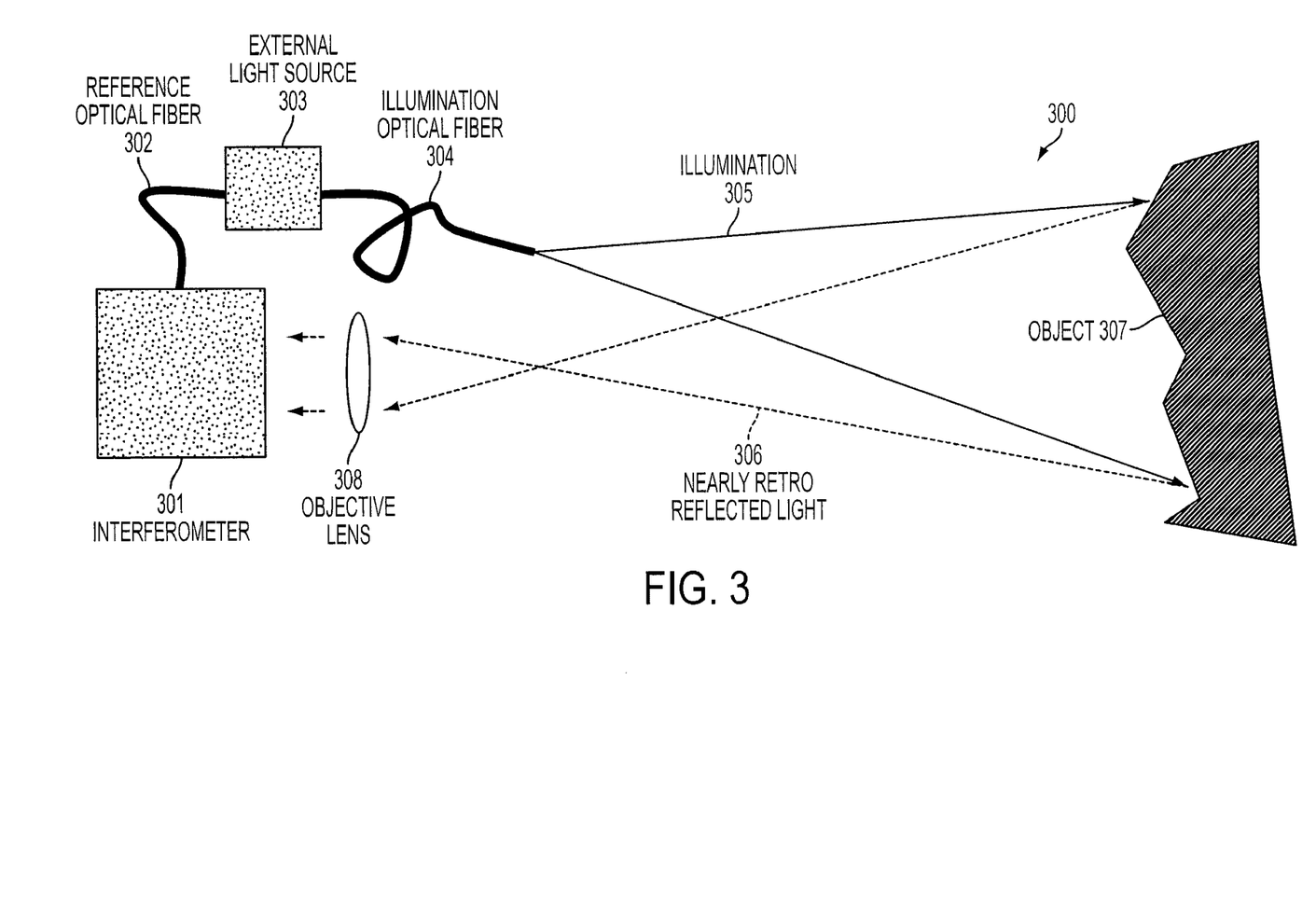
FIG. 3 is a functional block diagram of a HOST system, including an illumination source that is separate from an interferometer, where the impinging light from the source is directed directly to the object, in accordance with an embodiment of the present invention.

Yet another embodiment of the present invention is shown in FIG. 3, as HOST system 300. The HOST system includes an external light source 303 which provides the interferometer 301 with a reference arm signal by way of a reference optical fiber 302. An illumination optical fiber 304, connected to external light source 303, emits illumination light 305 onto the object under test 307. The nearly retro-reflected light 306 is returned to interferometer 301 through objective lens 308. The illumination optical fiber 304 is effective in providing mutually coherent illumination. The illumination optical fiber (or fibers, if more that one fiber is used) may be of the polarizing type and the interferometer may be designed to receive the emitted polarization (or some transformed state of the emitted polarization that is induced by interaction with the retro-reflective patina). It is noted that FIGS. 2 and 3 each shows an embodiment of the present invention in which the impinging illumination and the objective lens are not coaxial.

In general, the coherence length of the light source in a HOST system must be long enough to accommodate any optical path difference between the object under test and the reference arms (or one may use a delay line in the reference arm). If the HOST system includes a wavefront shearing type of interferometer, then the coherence length may typically be much shorter.

In addition, a retro-reflective HOST system may measure differential deformation of an object using two or more phase measurements. Any single phase measurement may employ a variety of shifting techniques (sequential or simultaneous) and noise deducing techniques, as described, for example, in Dynamic Phase-Shifting Electronic Speckle Pattern Interferometer, by Michael North Morris, et. al., presented at SPIE, August 2005, which is incorporated herein by reference.

An absolute displacement measuring interferometer may be used to track or correct the position of the interferometer relative to the object. This may include multiple retro-reflective targets/beam pairs. Similarly, imaging absolute distance devices may be used, such as an imaging LIDAR.

A camera, typically employing a charge-coupled device (CCD) may be used to record the speckle images, usually in a monochromatic light. A phase shifting technique may be used to extract the wavefront phase information from the image intensity recorded by the camera.

The present invention may be used for testing large objects (work pieces) from a short distance. For example, an object having a spherical surface with a radius of greater than 20 meters may be tested with an interferometer so that the object lens is located less than 5 meters away from the spherical surface. If the interferometer and object are on a common bench then the entire bench may be rotated as a unit to measure gravity deflections in the sphere.

Figure 4:
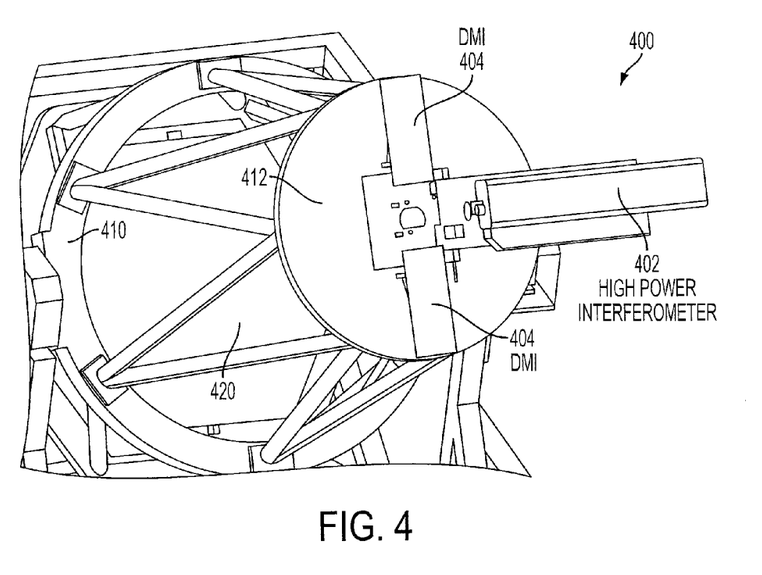
FIGS. 4, 5 and 6 are perspective views of a test set frame placed into different orientations, including a HOST system for measuring surface deformations or a topology of a large mirror used in a telescope, in accordance with an embodiment of the present invention.
Figure 5:
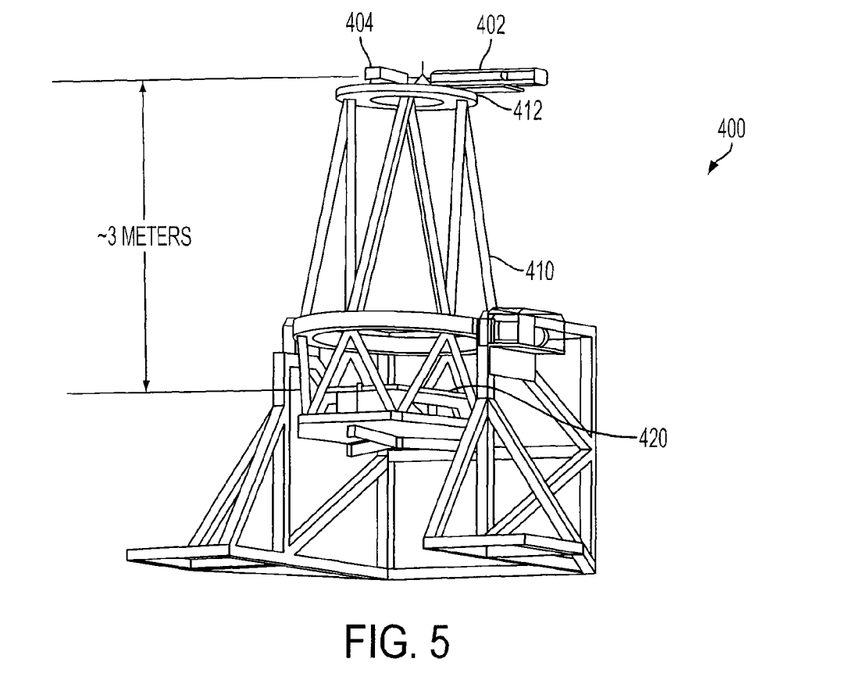
Figure 6:
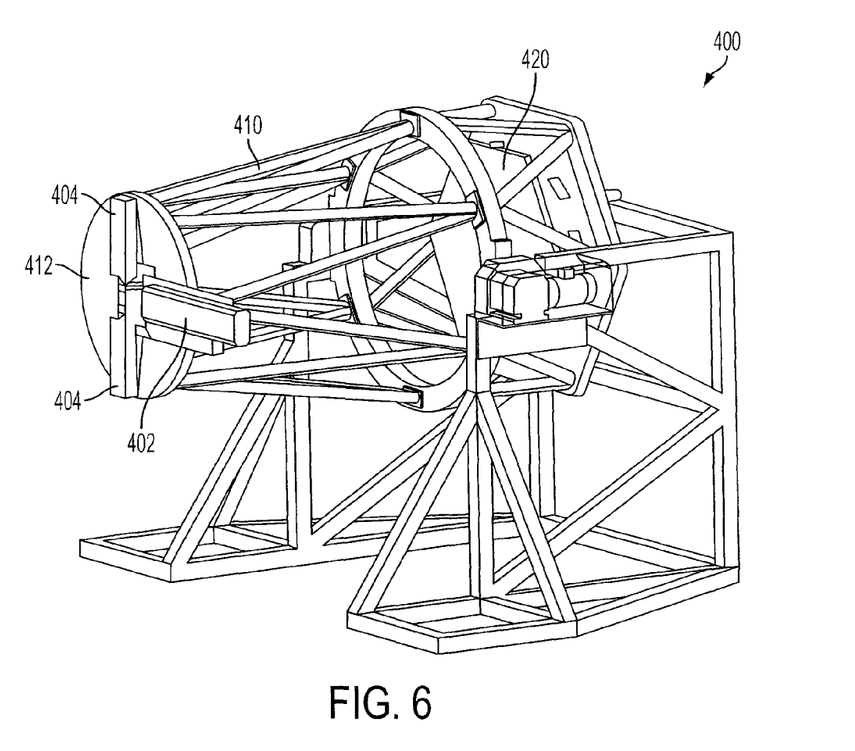

One example may be measuring MEMS mirror assemblies. Another example may be testing deformable mirrors, where the shape of the mirror surface is controlled and monitored in situ. An example of a system for measuring deformations in a mirror is shown in FIGS. 4, 5 and 6. As shown, a HOST system 400 includes interferometer 402 and two displacement measuring interferometers (DMIs), generally designated as 404, disposed on platform 412 of test set frame 410. Mirror 420, which is the object under test, is supported by the test set frame. The mirror under test includes a speckle pattern, which is attached or deposited onto its surface, as described before.

The test set frame 410 holds the interferometer in a constant relationship to the mirror under test. The test set frame rotates on one axis and swings the mirror from a zenith pointing direction (FIG. 5) to a horizon pointing direction (FIG. 6). The mirror may be mounted in any one of six different orientations, so as to allow for measurement of the effect of gravity on the mirror over a large range of orientations.

The test set frame is configured to ensure that the speckle pattern is large enough to cover a series of pixels for proper mirror characterization. Accordingly, a pin hole of appropriate size is selected. In addition, a lens is selected to allow the imaging of the entire mirror. With a diameter of approximately 1.5 meters and a test set framework that holds the interferometer approximately 3 meters away, the interferometer objective is f/2 or faster.

The interferometer is configured to constantly monitor the surface of the mirror for changes, while strain is induced in the mirror due to gravity. If any change greater than ¼ of the interferometer wavelength is made between captured frames, the measured surface variations may have ambiguities. Consequently, the present invention continuously monitors the surface of the mirror.

The mirror is mounted in the test set frame so that it mimics the conditions of the mirror when mounted in a telescope in the zenith pointing orientation. The interferometer then takes an image of the mirror in this condition. Based on previous measurements of the mirror in a Fizeau test set, the surface configuration of the mirror is known. The interferometer collects image data as quickly as it can for the duration of the test. To speed up the image data collection. the interferometer does not process any of the data, but instead, passes the image data directly through to a storage device.

In operation, interferometer 402 measures the variations in the phase of the speckle pattern deposited on mirror 420, as the surface of the mirror changes due to changes in orientation of the test set frame. While the interferometer is collecting data, the test set frame is slowly rotated back to the zenith pointing condition. The collection of data on the return trip allows for a determination of the repeatability of the mirror stresses. The test may be performed with the mirror rotated about its axis in 60 degree increments.

As the large test set frame is rotated, the structure deflects by small amounts. This frustrates the ability to measure variations in the power term of the surface (radius of curvature). Rather than fight this effect, the present invention continuously monitors the distance between the interferometer and the mirror. An accurate way of monitoring the distance includes placing the two DMIs 404 on platform 412. It will be appreciated that because the speckle interferometer is on the central measurement axis of HOST system 400, the DMIs are offset and, therefore, subject to Abbe errors. The two DMIs are placed, as shown in FIG. 4, on either side of the central measurement axis of the test set frame. This allows for the cancellation of the Abbe errors by simple averaging.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for testing a surface of an object comprising:
   an interferometer for receiving illumination reflected from the surface of the object,
   a surface treatment disposed on the surface of the object for providing a retro-reflective patina, and an objective lens disposed between the interferometer and the surface treatment for producing a speckle image of at least a portion of the surface of the object, wherein the retro-reflective patina is configured to substantially retro-reflect the illumination from the surface of the object, and the retro-reflective patina is attached to the surface of the object by an electroplating technique.

2. The system in claim 1 wherein
the retro-reflective patina includes a plurality of cube corners.

3. The system in claim 1 wherein
the retro-reflective patina includes a plurality of dielectric spheres.

4. The system in claim 1 wherein
the retro-reflective patina includes a combination of cube corners and dielectric spheres.

5. The system in claim 1 including
an illumination source for impinging illumination onto the surface of the object, wherein the retro-reflective patina reflects light from the surface of the object within 4 degrees of a line parallel to the impinging illumination.

6. The system in claim 1 including
an illumination source for impinging illumination onto the surface of the object, wherein the retro-reflective patina reflects light from the surface of the object within 20 degrees of a line parallel to the impinging illumination.

7. The system in claim 1 including
an illumination source for impinging illumination onto the surface of the object, and the objective lens configured to receive the illumination from the surface of the object and pass the illumination toward the interferometer.

8. The system in claim 7 wherein
the illumination source and the objective lens are not co-axial.

9. The system in claim 1 including
an absolute distance measuring device for monitoring a location of the object relative to the interferometer.

10. A method for measuring a topology of an object using speckle interferometry comprising the steps of:
disposing retro-reflective elements (RREs) on at least one surface of the object,
impinging light onto the at least one surface of the object,
measuring, using a speckle interferometer, returned light from the at least one surface of the object to determine the topology of the object, and
monitoring the location of the object relative to the interferometer by using an absolute distance measuring device.

11. The method of claim 10 wherein the step of disposing RREs includes:
fastening dielectric beads to the at least one surface of the object.

12. The method of claim 10 wherein the step of disposing RREs includes:
adhering a retro-reflective tape to the at least one surface of the object.

13. The method of claim 10 wherein the step of disposing RREs includes:
fastening optical cube corners to the at least one surface of the object.

14. The method of claim 10 wherein the step of disposing RREs includes:
spatially distributing the RREs in a random manner.

15. The method of claim 10 wherein the step of disposing RREs includes:
spatially distributing the RREs in a structured manner.

16. The method of claim 10 wherein the step of measuring the returned light includes:
using a camera to record images of the returned light from the RREs disposed on the at least one surface of the object.

17. A system for testing a surface of an object comprising:
an interferometer for receiving illumination reflected from the surface of the object,
a surface treatment disposed on the surface of the object for providing a retro-reflective patina, and
an objective lens disposed between the interferometer and the surface treatment for producing a speckle image of at least a portion of the surface of the object,
wherein the retro-reflective patina is configured to substantially retro-reflect the illumination from the surface of the object, and
an absolute distance measuring device for monitoring a location of the object relative to the interferometer.

18. The system in claim 17 wherein
the retro-reflective patina is adhered to the surface of the object.

19. The system in claim 17 wherein
the retro-reflective patina includes a plurality of cube corners.

20. The system in claim 17 wherein
the retro-reflective patina includes a plurality of dielectric spheres.

* * * * *